United States Patent
Do (10) Patent No.: US 10,207,745 B2
(45) Date of Patent: Feb. 19, 2019

(54) REAR VEHICLE BODY REINFORCING STRUCTURE

(71) Applicants: Hyundai Motor Company, Seoul (KR); Kia Motors Corporation, Seoul (KR)

(72) Inventor: Log Won Do, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/668,413

(22) Filed: Aug. 3, 2017

(65) Prior Publication Data

US 2018/0334194 A1 Nov. 22, 2018

(30) Foreign Application Priority Data

May 16, 2017 (KR) .................. 10-2017-0060522

(51) Int. Cl.
  *B62D 29/00* (2006.01)
  *B62D 25/20* (2006.01)
  *B62D 21/09* (2006.01)

(52) U.S. Cl.
  CPC .............. *B62D 25/20* (2013.01); *B62D 21/09* (2013.01); *B62D 29/007* (2013.01)

(58) Field of Classification Search
  CPC ............ B62D 25/20; B62D 25/2027; B62D 25/2036; B62D 25/2009; B62D 21/02; B62D 25/087; B62D 25/2018

USPC .... 296/193.07, 187.08, 204, 193.06, 193.08, 296/64, 97.23; 428/99, 116, 158, 457, 428/61, 85; 280/756, 788, 834, 588.1, 280/783.1, 794.1
See application file for complete search history.

(56) References Cited

U.S. PATENT DOCUMENTS

| 5,501,289 A | * | 3/1996 | Nishikawa | ............... B60K 1/04 180/65.1 |
| 7,699,385 B2 | * | 4/2010 | Kurata | ............... B62D 25/2036 296/187.08 |
| 2005/0082879 A1 | * | 4/2005 | Goto | .................. B62D 25/2018 296/204 |

(Continued)

FOREIGN PATENT DOCUMENTS

JP H 06-316277 A 11/1994
JP 2015-128982 A 7/2015

*Primary Examiner* — D Glenn Dayoan
*Assistant Examiner* — Sunsurraye Westbrook
(74) *Attorney, Agent, or Firm* — Morgan, Lewis & Bockius LLP (57) ABSTRACT

A rear vehicle body reinforcement structure may include side seal members disposed in the left and right sides of the vehicle along a width direction of the vehicle; rear floor side members extending along the longitudinal direction of the vehicle and assembled with the side seal members respectively by being disposed in the left and right of the vehicle along the width direction of the vehicle, a center floor panel and a rear floor panel, assembled to the side seal members; center floor side members extending along the longitudinal direction of the vehicle and assembled to the center floor panel; a tunnel portion that is provided in the center floor panel and protrudes upward along the height direction of the vehicle; and tunnel side members that extend along the longitudinal direction of the vehicle and assembled to the tunnel portion.

10 Claims, 5 Drawing Sheets

(56) References Cited

U.S. PATENT DOCUMENTS

2011/0260503 A1* 10/2011 Fujii .................. B62D 21/11
296/205
2015/0042128 A1* 2/2015 Kowaki ............ B62D 25/2027
296/193.07

* cited by examiner

REAR VEHICLE BODY REINFORCING STRUCTURE

CROSS-REFERENCE(S) TO RELATED APPLICATIONS

The present application claims priority to Korean Patent Application No. 10-2017-0060522 filed on May 16, 2017, the entire contents of which are incorporated herein for all purposes by this reference.

BACKGROUND OF THE INVENTION

Field of the Invention

The present invention relates to a rear vehicle body reinforcing structure of a vehicle. More particularly, the present invention relates to a rear vehicle body reinforcing structure in which a ring-type truss structure is applied to a rear floor panel.

Description of Related Art

A floor panel of a vehicle body is a panel that forms a bottom side of the vehicle body, and is classified into a front floor panel, a center floor panel, and a rear floor panel along a length direction of the vehicle.

A sheet where an occupant in a passenger compartment can seat is provided on an upper side of the floor panel, an exhaust pipe or a propeller shaft is provided in a bottom side of the floor panel, and a rear portion of the floor panel forms a bottom surface of a trunk compartment.

The floor panel has a substantially rectangular shape and includes a stainless steel material having a predetermined thickness, and the stiffness of the floor panel greatly affects the noise, vibration, and harshness (NVH) performance of the vehicle.

Conventionally, a reinforcement member that extends along a width direction of the vehicle is provided in the rear floor panel to reinforce the stiffness of the floor panel, to reinforce the stiffness of the rear floor panel, but the stiffness of the rear floor panel cannot be sufficiently reinforced by the conventional reinforcement member.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear vehicle body reinforcement structure that can improve NVH performance of a vehicle by enhancing the bending stiffness and twist stiffness of a rear floor panel with the application of a ring-shaped trust structure to the rear floor panel.

A rear vehicle body reinforcement structure according to an exemplary embodiment of the present invention includes side seal members that extend along a longitudinal direction of a vehicle and are disposed in the left and right sides of the vehicle along a width direction of the vehicle; rear floor side members that extend along the longitudinal direction of the vehicle and are assembled with the side seal members respectively by being disposed in the left and right of the vehicle along the width direction of the vehicle, a center floor panel and a rear floor panel, edge portions of each assembled to the side seal members; center floor side members that extend along the longitudinal direction of the vehicle and assembled to the center floor panel to reinforce the same by being disposed in the left and right side of the vehicle along the width direction of the vehicle; a tunnel portion that is provided in the center floor panel and protrudes upward along the height direction of the vehicle; and tunnel side members that extend along the longitudinal direction of the vehicle and assembled to the tunnel portion to reinforce the tunnel portion by being disposed in the left and right side with reference to the tunnel portion, wherein the rear vehicle body reinforcement structure may further include a first horizontal directional reinforcement member that extends along the width direction of the vehicle and integrally connects the left and right rear floor side members, the left and right center floor side members, and the left and right tunnel side members.

Lateral end portions of the first horizontal directional reinforcement member may be engaged to bottom sides of the rear floor side members while being overlapped therewith.

The first horizontal directional reinforcement member may include an aluminum or stainless steel plate.

Rear lower extension panels that extend in a rear side along the longitudinal direction of the vehicle and extend downward along the height direction of the vehicle may be attached to the side seal members, the rear lower extension panels may be assembled to the rear floor side members, and rear floor corner reinforcement members may be disposed over the rear lower extension panels and the center floor side members.

The rear floor corner reinforcement members may connect the rear lower extension panels and the center floor side members by being mounted to the rear lower extension panels through one end portions and mounted to the center floor side member through the other end portions.

A triangular truss structure may be formed by the rear floor corner reinforcement members, the rear lower extension panels, and the first horizontal directional reinforcement member.

A spare tire well panel, wherein a spare tire can be received, may be assembled to the rear floor panel, a mounting bracket may be attached to the spare tire well panel, and rear floor inclination reinforcement members may be provided in a manner of spanning between the mounting bracket of the spare tire well panel and the rear lower extension panels.

The rear floor inclination reinforcement members may connect the rear lower extension panels and the spare tire well panel by being mounted to the rear lower extension panels through one end portions thereof and mounted to the mounting bracket of the spare tire well panel through the other end portions thereof.

One end portions of the rear floor inclination reinforcement members may be mounted to the rear lower extension panels while being overlapped with one end portions of the rear floor corner reinforcement members.

The rear floor inclination reinforcement members may be disposed in the left and right sides along the width direction of the vehicle, one end portions of the left and right rear floor inclination reinforcement members may be provided to be close to the mounting bracket, and the other end portions of the left and right rear floor inclination reinforcement members may extend at an acute angle to each other and then, respectively mounted to the rear lower extension panels.

A second directional reinforcement member may be provided in the mounting bracket in a manner of connecting one end portions of the left and right rear floor inclination reinforcement members.

A third horizontal directional reinforcement member may be provided in a manner of connecting the left and right rear floor inclination reinforcement members.

The third horizontal direction reinforcement members may be provided further ahead than the second horizontal directional reinforcement member in the longitudinal direction of the vehicle, and may have a relatively longer length than the second horizontal directional reinforcement member.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments which may be included within the spirit and scope of the invention as defined by the appended claims.

Figure 1:
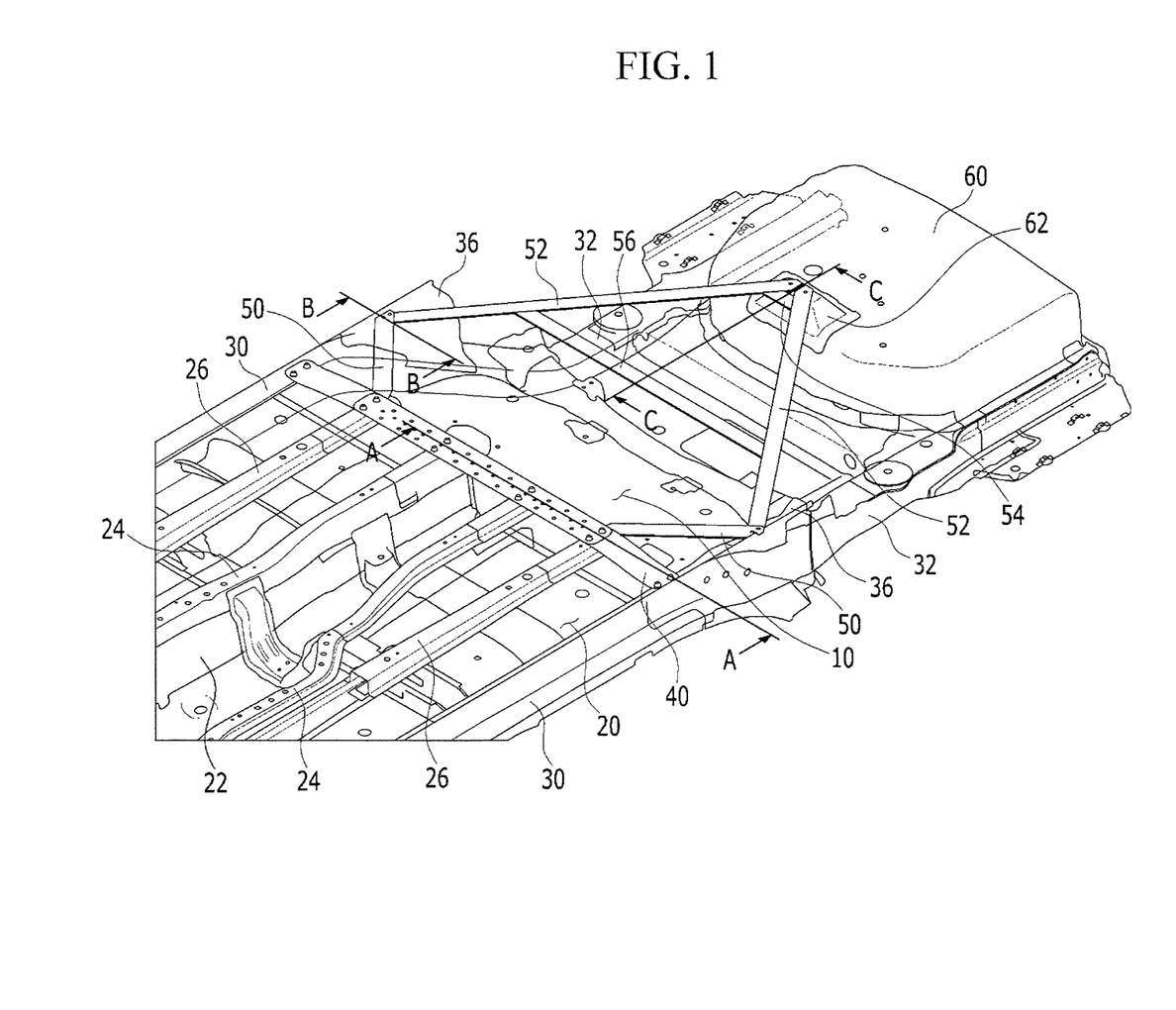
FIG. 1 is a perspective view of a rear vehicle body reinforcement structure according to an exemplary embodiment of the present invention.

Referring to FIG. 1, a rear vehicle body where a reinforcement structure according to an exemplary embodiment of the present invention may be provided with a rear floor panel 10 including a stainless steel material in a rectangular panel shape.

A center floor panel 20 that is disposed more forward along a longitudinal direction of the vehicle than the rear floor panel 10 may be assembled to the rear floor panel 10.

A tunnel portion 22 that protrudes upwards along a height direction of the vehicle and extends along the longitudinal direction of the vehicle may be provided in the center floor panel 20. The tunnel portion 22 may receive an exhaust system pipe, a muffler, or a shaft.

To reinforce the stiffness of the tunnel portion 22, tunnel side members 24 may be disposed to bottom lateral edge portions of the tunnel portion 22. The tunnel side member 24 may extend along the longitudinal direction of the vehicle.

Center floor side members 26 may be assembled to the center floor panel 20 to reinforce the stiffness of the center floor panel 20. The center floor side member 26 may extend along the longitudinal direction of the vehicle, and may be disposed further to an external side than the tunnel side member 24 in the width direction of the vehicle. The center floor side members 26 may be disposed in the left and right sides respectively along the width direction of the vehicle with reference to the tunnel portion 22.

Side seal members 30 may be assembled with lateral edge portions of the center floor panel 20 and a portion of an edge portion of the rear floor panel 10, and the side seal members 30 extend along the longitudinal direction of the vehicle and may be disposed in the left and right sides along the width direction of the vehicle, respectively.

Rear floor side members 32 may be assembled to rear end portions of the side seal members 30, and the rear floor side members 32 extend along the longitudinal direction of the vehicle and may be disposed in the left and right sides along the width direction of the vehicle, respectively.

Figure 2:
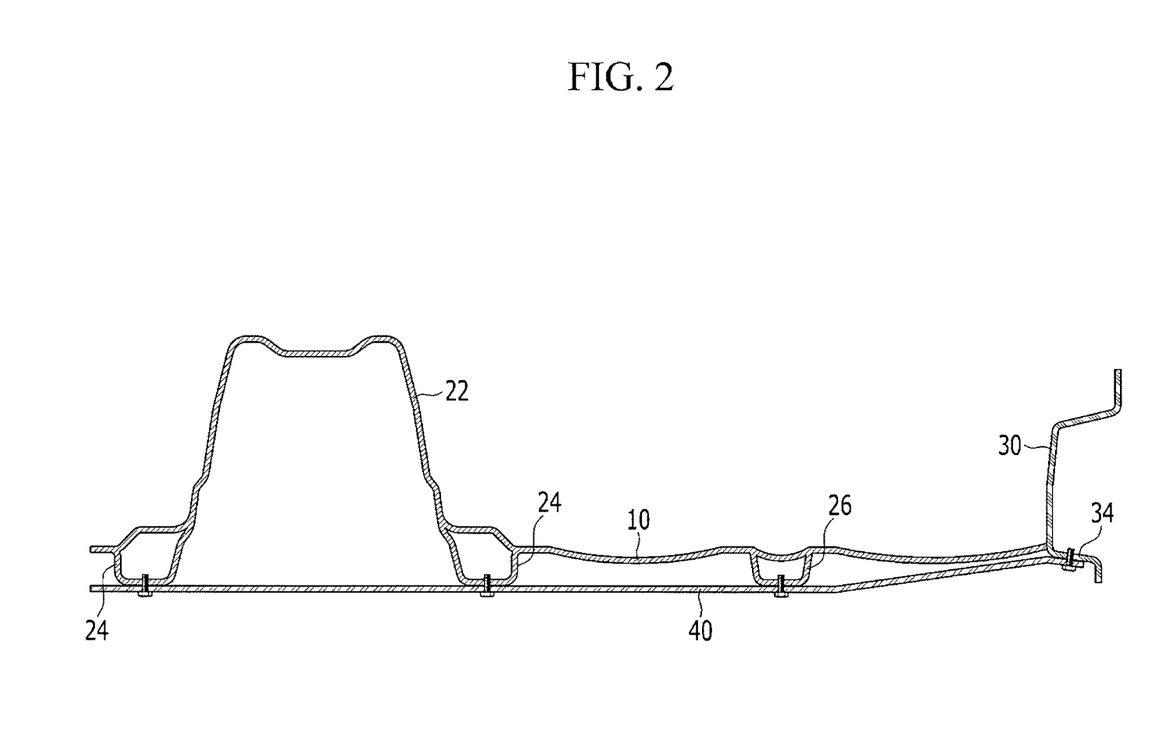
FIG. 2 is a cross-sectional view of FIG. 1, taken along the line A-A.

Referring to FIG. 1 and FIG. 2, a first horizontal directional reinforcement member 40 extending along the width direction of the vehicle may be assembled with the rear floor side members 32, the center floor side members 26, the tunnel side members 24, and the rear floor panel 10.

That is, one end portion of the first horizontal directional reinforcement member 40 is assembled to one of the left and right rear floor side members 32, and then the first horizontal directional reinforcement member 40 may be sequentially assembled to one center floor side member 26, one tunnel side reinforcement member 24, the other center floor side member 26, and the other rear floor side member 32.

Further, lateral end portions of the first horizontal directional reinforcement member 40 may be bolt-engaged to a bottom side 34 of the rear floor side member 32 while being overlapped thereto, and may have a shape that straightly extends along the width direction of the vehicle.

The first horizontal directional reinforcement member 40 may include an aluminum plate or a stainless steel plate having a thickness of approximately 5 mm and a width of approximately 50 mm.

As described above, the vertical directional members that are disposed along the longitudinal direction of the vehicle and then mounted to the floor panel, that is, the rear floor side members 32, the center floor side members 26, and the tunnel side members 24 are integrally connected through the first horizontal directional reinforcement member 40 wherein a bending stiffness of the floor panels can be enhanced to improve a NVH performance of the vehicle.

Figure 3:
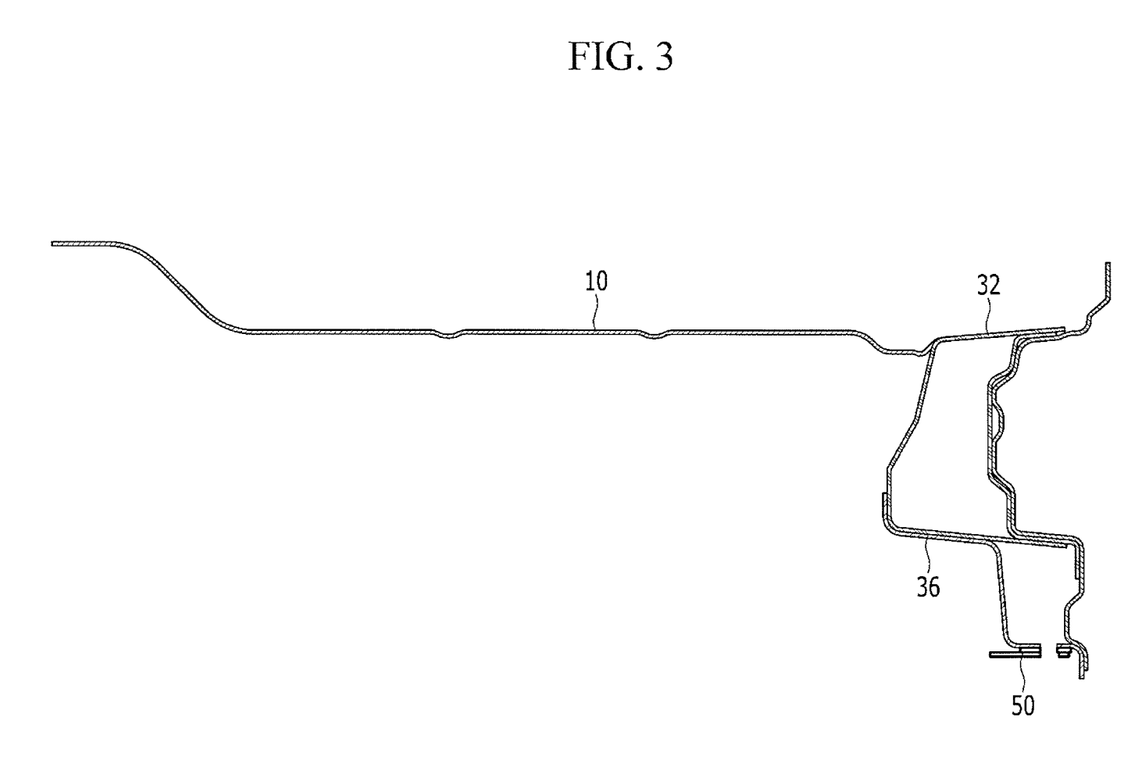
FIG. 3 is a cross-sectional view of FIG. 1, taken along the line B-B.

Referring to FIG. 1 and FIG. 3, a rear lower extension panel 36 that extends to a rear side along the longitudinal direction of the vehicle and a bottom side along the height direction of the vehicle is attached to each of the side seal member 30, and the rear lower extension panels 36 may be assembled to the rear floor side members 32.

Rear floor corner reinforcement members 50 may be disposed over the rear lower extension panels 36 and the center floor side members 26.

That is, each rear floor corner reinforcement member 50 connects the rear lower extension panel 36 and the center floor side member 26, and one end portion of the rear floor corner reinforcement member 50 may be mounted to the rear lower extension panel 36 and the other end portion may be mounted to the center floor side member 26.

The rear floor corner reinforcement members 50 may be disposed in the left and right sides along the width direction of the vehicle.

The rear floor corner reinforcement members 50, the rear lower extension panels 36, and the first horizontal directional reinforcement member 40 form a triangular truss structure so that an assembly stiffness of the front portion of the rear floor side member 32 and the rear floor panel 10 is enhanced, and accordingly, a vertical bending movement and twist movement of the rear floor side member 32 can be suppressed, improving the NVH performance of the vehicle.

Figure 4:
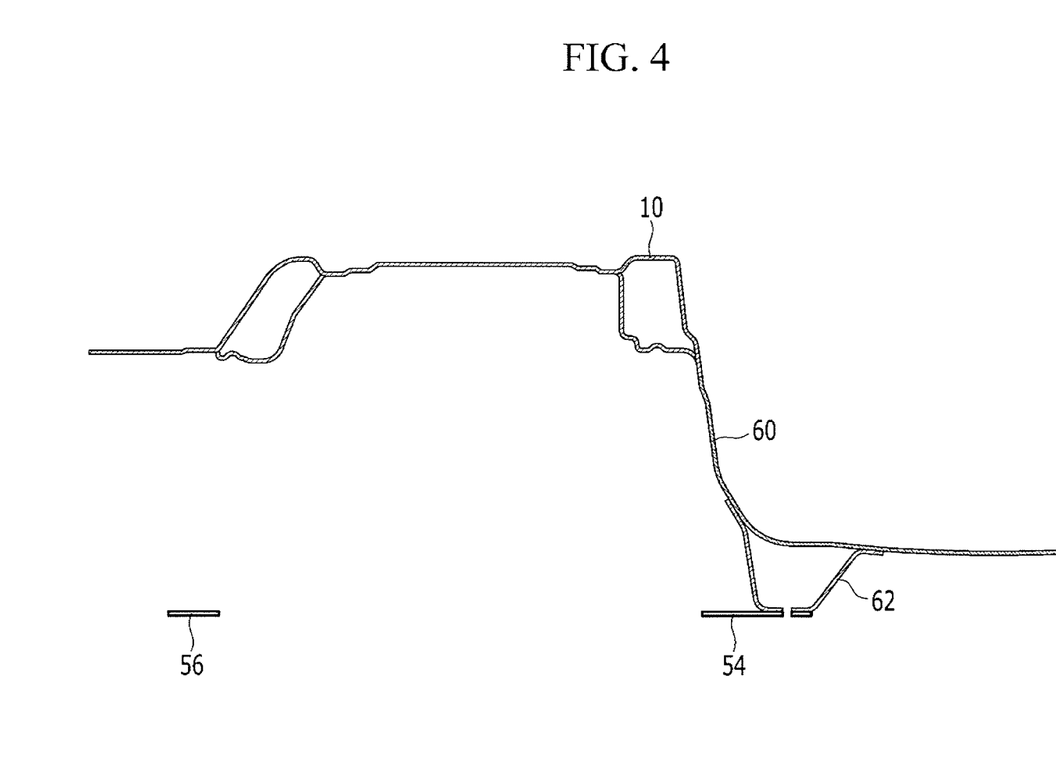
FIG. 4 is a cross-sectional view of FIG. 1, taken along the line C-C.

Referring to FIG. 1 and FIG. 4, a spare tire well panel 60 where a spare tire can be accommodated is assembled to the rear floor panel 10. A mounting bracket 62 is attached to the spare tire well panel 60, and a rear floor inclination reinforcement member 52 may be disposed between the mounting bracket 62 of the spare tire well panel 60 and the rear lower extension panel 36 over the mounting bracket 62 of the spare tire well panel 60 and the rear lower extension panel 36.

That is, the rear floor inclination reinforcement member 52 connects the rear lower extension panel 36 and the spare tire well panel 60, and one end portion of the rear floor inclination reinforcement member 52 may be assembled to the rear lower extension panel 36 and the other end portion thereof may be assembled to the mounting bracket 62 of the spare tire well panel 60.

One end portion of the rear floor inclination reinforcement member 52 may be assembled to the rear lower extension panel 36 while being overlapped with one end portion of the rear floor corner reinforcement member 50.

The rear floor inclination reinforcement members 52 may be disposed in the left and right sides of the vehicle along the width direction of the vehicle.

One end portion of the left and the right rear floor inclination reinforcement members 52 may be mounted to be close to each other in the mounting bracket 62, the other end portions of the left and the right rear floor inclination reinforcement members 52 may extend at an acute angle to each other and then mounted to the rear lower extension panels 36, respectively.

Since the bending stiffness and twist stiffness of the rear vehicle body are enhanced by the above-described rear floor inclination reinforcement members 52, further improved integral stiffness of the vehicle can be assured under lateral load input conditions including sudden lane change, rotary driving, and the like, lateral bending movement of front portions of the rear floor side members 32 can be suppressed, and a vertical bending mode of a spare tire portion connected to the rear floor panel 10 under vertical load input conditions including an uneven road can be suppressed, improving the NVH performance of the vehicle.

The rear floor inclination reinforcement members 52 may include an aluminum or stainless steel plate having a thickness of approximately 5 mm and a width of approximately 50 mm.

The mounting bracket 62 is configured to assure a sufficient gap margin between the rear floor inclination reinforcement members 52 and a fuel tank, a rear suspension, a rear exhaust system, and the like, and to absorb a height difference between the bottom surface of the spare tire well panel 60 and the rear lower extension panels 36.

A second horizontal directional reinforcement member 54 may be provided in the mounting bracket 62 to connect one end portion of the left and right rear floor inclination reinforcement members 52, and a third horizontal directional reinforcement member 56 may be further provided in the mounting bracket 62 to connect the left and right rear floor inclination reinforcement members 52.

The third horizontal directional reinforcement member 56 may be disposed further forward than the second horizontal directional reinforcement member 54 along a longitudinal direction of the vehicle, and may have a relatively longer length.

As the length of the rear floor inclination reinforcement member 52 is increased, the vehicle may experience an abnormal movement or noise while driving under a specific driving condition due to a twist or bending of the rear floor inclination reinforcement member 52, and therefore, one end portion of the left and right rear floor inclination reinforcement members 52 are strongly and integrally connected to the second horizontal directional reinforcement members 54 at locations where the left and right rear floor inclination reinforcement members 52 meet each other, and the left and right rear floor inclination reinforcement members 52 are strongly and integrally or monolithically connected to each other in a horizontal direction through the third horizontal directional reinforcement member 56 to prevent the generation of the abnormal movement and noise.

Alternatively, one end portion of the rear floor inclination reinforcement members 52 may be directly welded to the mounting bracket 62 instead of using the second horizontal directional reinforcement member 54.

Figure 5:
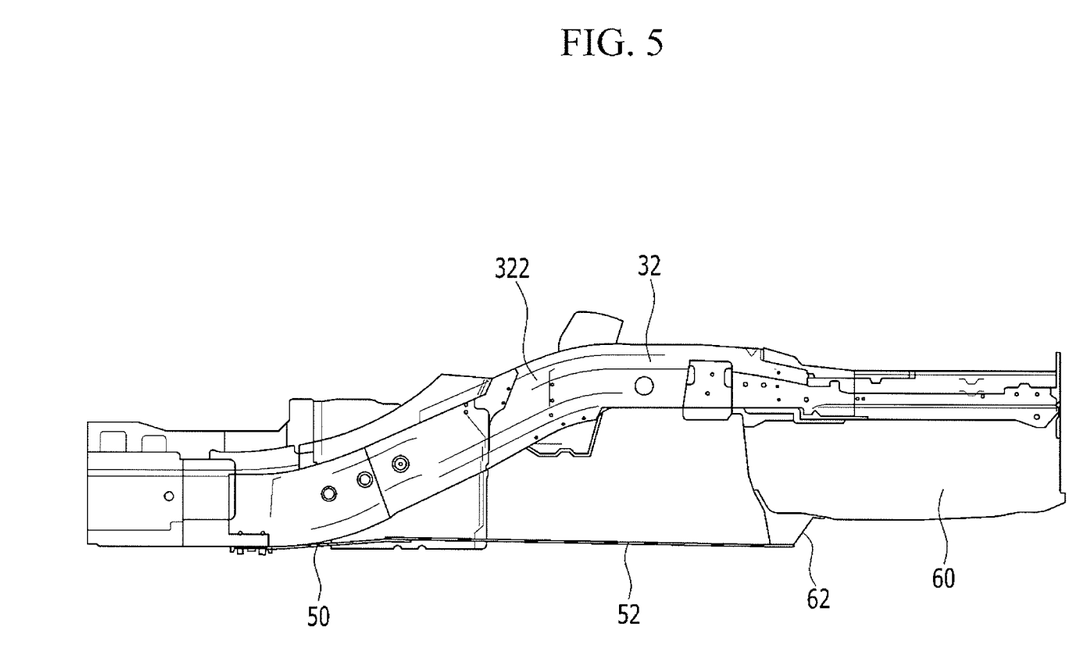
FIG. 5 is a side view of a rear vehicle body reinforcement structure according to the exemplary embodiment of the present invention.

Referring to FIG. 1 and FIG. 5, the rear floor side members 32 have inclination portions 322 by being bent downward along a height direction of the vehicle at a given rear portion in the longitudinal direction of the vehicle, and a rear vehicle body may experience a vertical vibration and bending deformation due to the inclination portions 322 while driving. In an exemplary embodiment of the present invention, since the left and right rear floor side members 32 are connected to each other through the rear floor inclination reinforcement members 52, the rear floor corner reinforcement members 50, and the second and third horizontal directional reinforcement members 54 and 56, and the left and right rear floor side members 32 are connected to the spare tire well panel 60 through the rear floor inclination reinforcement members 52, structural stiffness of the rear vehicle body can be enhanced, and accordingly vertical movement and bending deformation of the rear floor side members 32 can be reduced, improving the NVH performance of the vehicle.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear vehicle body reinforcement structure including side seal members that extend along a longitudinal direction of a vehicle and are disposed in left and right sides of the vehicle along a width direction of the vehicle; rear floor side members that extend along the longitudinal direction of the vehicle and are assembled with the side seal members respectively by being disposed in the left and right of the vehicle along the width direction of the vehicle, a center floor panel and a rear floor panel, edge portions of each assembled to the side seal members; center floor side members extending along the longitudinal direction of the vehicle and assembled to the center floor panel to reinforce the same by being disposed in the left and right sides of the vehicle along the width direction of the vehicle; a tunnel portion that is provided in the center floor panel and is protrudingly formed upward along a height direction of the vehicle; and tunnel side members extending along the longitudinal direction of the vehicle and assembled to the tunnel portion to reinforce the tunnel portion by being disposed in the left and right sides predetermined with respect to the tunnel portion, further comprising:
  a first horizontal directional reinforcement member that extends along the width direction of the vehicle and integrally connects the left and right rear floor side members, the left and right center floor side members, and the left and right tunnel side members,
  wherein rear lower extension panels that extend in a rear side along the longitudinal direction of the vehicle and extend downward along the height direction of the vehicle are attached to the side seal members, and the rear lower extension panels are assembled to the rear floor side members,
  wherein a spare tire well pane where a spare tire is configured to be received is assembled to the rear floor panel, a mounting bracket is attached to the spare tire well panel, and rear floor inclination reinforcement members are provided by spanning between the mounting bracket of the spare tire well panel and the rear lower extension panels,
  wherein the rear floor inclination reinforcement members include a left rear floor inclination reinforcement member and a right rear floor inclination reinforcement member, which are disposed in the left and right sides of the vehicle, respectively, along the width direction of the vehicle, first end portions of the left and right rear floor inclination reinforcement members are provided to be adjacent to the mounting bracket, and second end portions of the left and right rear floor inclination reinforcement members extend at an acute angle to each other and then, respectively mounted to the rear lower extension panels, and
  wherein a second directional reinforcement member is provided in the mounting bracket by connecting first end portions of the left and right rear floor inclination reinforcement members.

2. The rear vehicle body reinforcement structure of claim 1, wherein lateral end portions of the first horizontal directional reinforcement member are engaged to bottom sides of the rear floor side members while being overlapped therewith.

3. The rear vehicle body reinforcement structure of claim 1, wherein the first horizontal directional reinforcement member includes an aluminum or stainless steel plate.

4. The rear vehicle body reinforcement structure of claim 1, wherein
  rear floor corner reinforcement members are provided over the rear lower extension panels and the center floor side members.

5. The rear vehicle body reinforcement structure of claim 4, wherein the rear floor corner reinforcement members connect the rear lower extension panels and the center floor side members by being mounted to the rear lower extension panels through first end portions and mounted to the center floor side member through second end portions.

6. The rear vehicle body reinforcement structure of claim 4, wherein a triangular truss structure is formed by the rear floor corner reinforcement members, the rear lower extension panels, and the first horizontal directional reinforcement member.

7. The rear vehicle body reinforcement structure of claim 4, wherein the rear floor inclination reinforcement members connect the rear lower extension panels and the spare tire well panel by being mounted to the rear lower extension panels through first end portions thereof and mounted to the mounting bracket of the spare tire well panel through second end portions thereof.

8. The rear vehicle body reinforcement structure of claim 4, wherein first end portions of the rear floor inclination reinforcement members are mounted to the rear lower extension panels while being overlapped with first end portions of the rear floor corner reinforcement members.

9. The rear vehicle body reinforcement structure of claim 4, wherein a third horizontal directional reinforcement member is provided by connecting the left and right rear floor inclination reinforcement members.

10. The rear vehicle body reinforcement structure of claim 9, wherein the third horizontal direction reinforcement members are provided further forward than the second horizontal directional reinforcement member in the longitudinal direction of the vehicle, and has a relatively longer length than the second horizontal directional reinforcement member.

* * * * *